1

(12) United States Patent
Armes et al.

(10) Patent No.: US 8,413,160 B2
(45) Date of Patent: Apr. 2, 2013

(54) SYSTEMS, METHODS, AND COMPUTER PROGRAM PRODUCTS FOR TRANSACTION BASED LOAD BALANCING

(75) Inventors: David Armes, Phoenix, AZ (US); Ian Brown, Lewes E. Sussex (GB); Eric James Eldridge, Scottsdale, AZ (US); Conrad Orlando Menezes, Glendale, NJ (US); Claudio Valdes, Phoenix, AZ (US); John Ryan, Centreville, VA (US)

(73) Assignee: American Express Travel Related Services Company, Inc., New York, NY (US)

( * ) Notice: Subject to any disclaimer, the term of this patent is extended or adjusted under 35 U.S.C. 154(b) by 1303 days.

(21) Appl. No.: 11/767,356

(22) Filed: Jun. 22, 2007

(65) Prior Publication Data

US 2008/0072226 A1 Mar. 20, 2008

Related U.S. Application Data

(60) Provisional application No. 60/815,584, filed on Jun. 22, 2006.

(51) Int. Cl.
*G06F 9/455* (2006.01)
*G06F 9/46* (2006.01)

(52) U.S. Cl. .......................... 718/105; 718/101; 709/226

(58) Field of Classification Search .......................... None
See application file for complete search history.

(56) References Cited

U.S. PATENT DOCUMENTS

| | | | |
|---|---|---|---|
| 7,062,566 B2 * | 6/2006 | Amara et al. ................. | 709/229 |
| 7,600,229 B1 * | 10/2009 | Shmuylovich et al. ....... | 718/105 |
| 2002/0087694 A1 * | 7/2002 | Daoud et al. ................. | 709/226 |
| 2003/0105800 A1 * | 6/2003 | Cullen .......................... | 709/201 |
| 2003/0163704 A1 * | 8/2003 | Dick et al. .................... | 713/178 |
| 2004/0162836 A1 * | 8/2004 | Aronoff et al. ............... | 707/100 |
| 2005/0154681 A1 * | 7/2005 | Schmelzer .................... | 705/67 |
| 2007/0170245 A1 * | 7/2007 | Elbaum et al. ................ | 235/380 |

* cited by examiner

*Primary Examiner* — Kenneth Tang
(74) *Attorney, Agent, or Firm* — Snell & Wilmer L.L.P.

(57) ABSTRACT

In a packet-based transaction processing system, workload is balanced across multiple computer systems. A plurality of packets is received from a plurality of clients over a plurality of communications sessions. Each of the plurality of packets includes a portion of a transaction involving a financial transaction instrument that requires authorization. The plurality of packets are processed to assemble a plurality of transactions. Each of the plurality of transactions is then transmitted to an application server selected from a plurality of servers that provides authorization for the transactions. The server may be selected from the plurality of servers based on a round-robin distribution of the plurality of servers, and additionally, the round-robin distribution may be modified to account for a workload on each of the plurality of servers.

18 Claims, 10 Drawing Sheets

SYSTEMS, METHODS, AND COMPUTER PROGRAM PRODUCTS FOR TRANSACTION BASED LOAD BALANCING

CROSS-REFERENCE TO RELATED APPLICATIONS

This application claims priority to, and the benefit of, U.S. Provisional Patent Application No. 60/815,584, filed Jun. 22, 2006, which is hereby incorporated by reference in its entirely.

BACKGROUND

1. Field of the Invention

This invention generally relates to load balancing, and in particular, it relates to balancing workload associated with financial transactions across multiple computer systems.

2. Background Art

Customers often purchase items from a merchant using a transaction card, such as a credit card or a debit card. The customer presents the transaction card to the merchant at a point-of-sale (POS) terminal, and the merchant scans the card to obtain account information. The POS terminal then transmits the account information and the transaction information to a financial institution for authorization. The financial institution processes the transaction and returns an approval, declination, or referral message.

A financial institution that issues transaction cards, such as the American Express Company, Inc., of New York, N.Y., processes a large number of such authorization requests on a daily basis. For example, financial institutions may process over 500 authorization requests per second, and this processing load is often shared across multiple, geographically-dispersed processing centers.

Communications between merchants and processing centers generally utilize packet-based electronic messages and streaming protocols, such as the Internet Protocol (IP). In the case of IP communications, the concept of individual messages and transactions does not exist at the communications protocol level. From a communications protocol perspective, messages and/or transactions may be combined in a single packet or may be split across multiple packets of the communications protocol. Restructuring this stream of packets into individual, logical units of work is often left to the receiving application (e.g. a computer system performing the transaction authorization). In such an environment, it is often difficult to determine a beginning and an end of a unit of work and therefore, it is often difficult to adequately balance the resulting workload between multiple computing systems.

This problem is typically addressed by traditional load balancing devices, such as content switches, that route all data from a given source to a specific computer system. In a Web-based environment, a session is short lived (e.g., a few seconds to a few minutes), and these traditional, session-based load balancing devices adequately distribute the workload between multiple computer systems.

However, in an on-line transaction processing environment, communications sessions are generally long-lived (e.g., hours or days), and transaction volumes may vary significantly throughout the duration of the session. Therefore, traditional, session-based load balancing is generally not effective within the on-line transaction processing environment.

For example, a large merchant may have a store-based sever connecting to ten or more POS terminals, and a session between the server and a processing facility of the financial institution may be initiated when the store opens and may not be closed until twelve or more hours later. During that time, thousands of individual transactions may be processed. In contrast, a session from a small merchant may last a few minutes, and only a few authorization requests might be processed during that time. Therefore, methods of load balancing that treat all sessions equally are not ideal for a on-line transaction card processing environment.

BRIEF SUMMARY OF THE INVENTION

Accordingly, the present disclosure introduces methods, systems, and computer-program products for balancing workload across multiple computer systems.

According to various embodiments of the disclosed processes, a plurality of packets are received from a plurality of clients over a plurality of communications sessions. Each of the plurality of packets includes a portion of a transaction that requires authorization, and the plurality of packets are processed to assemble a plurality of transactions. Each of the plurality of transactions are then transmitted to a server selected from a plurality of servers that provides authorization for the transactions. The server may be selected from the plurality of servers based on a round-robin distribution of the plurality of servers, and additionally, the round-robin distribution may be modified to account for a workload on each of the plurality of servers.

Further features and advantages of the present invention as well as the structure and operation of various embodiments of the present invention are described in detail below with reference to the accompanying drawings.

BRIEF DESCRIPTION OF THE DRAWINGS/FIGURES

The features of the present invention will become more apparent from the detailed description set forth below when taken in conjunction with the drawings. The left-most digit of a reference number identifies the drawing in which the reference number first appears.

DETAILED DESCRIPTION OF THE INVENTION

Figure 1:
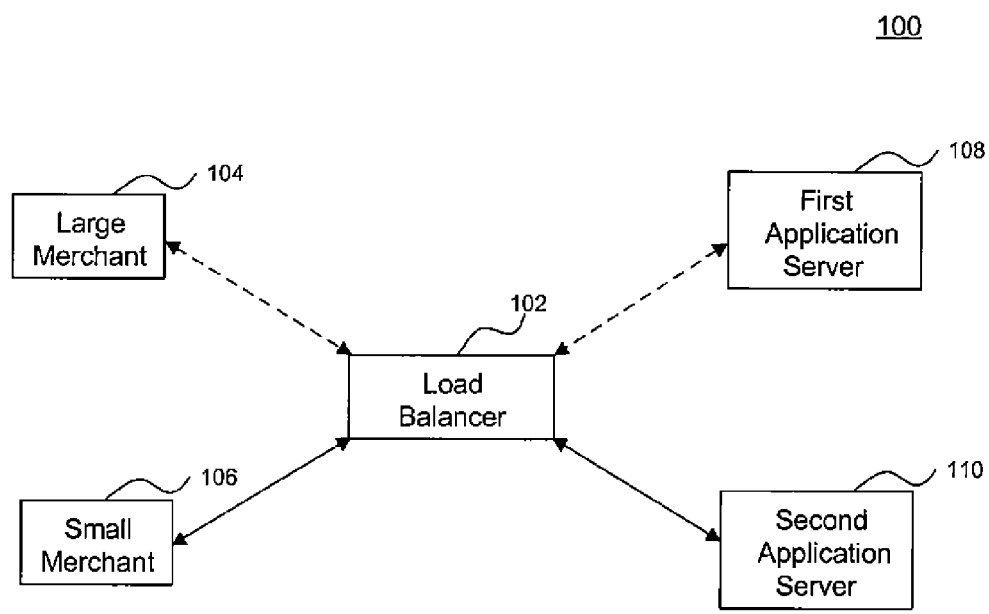
FIG. 1 is an example of a session-based load balancing system applied to an on-line transaction processing environment.

The present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

I. Terminology

The terms "user", "end user", "consumer", "customer", "participant", and/or the plural form of these terms are used interchangeably throughout herein to refer to those persons or entities capable of accessing, using, being affected by and/or benefiting from the tool described herein.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument. The terms "account provider" or "financial institution" as used herein refer to the financial institution associated with the account.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, mobile telephone handsets, personal digital assistants (PDAs) with wireless capability that includes, but is not limited to, near-field communications (NFC), or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

Persons skilled in the relevant arts will understand the breadth of the terms used herein and that the exemplary descriptions provided are not intended to be limiting of the generally understood meanings attributed to the foregoing terms.

II Overview

An example of session-based load balancing applied to the on-line transaction processing environment is described with reference to FIG. 1. In FIG. 1, a session-based load balancer 102 is connected with a large merchant 104 and a small merchant 106, and large merchant 104 and small merchant 106 simultaneously transmit transactions that require authorization to load balancer 102. Load balancer 102 is also connected to a first application server 108 and a second application server 110 that process the authorization requests and return approval, declination, or referral messages.

In this example, large merchant 104 transmits transactions to load balancer 102 at a rate of 25 transactions-per-second (TPS), while small merchant 106 transmits transactions to load balancer 102 at a rate of only 10 TPS. However, as load balancer 102 treats the sessions with large merchant 104 and small merchant 106 equally, all transactions from larger merchant 104 are passed to first application server 108, and all transactions from small merchant 106 are passed to second application server 110.

Therefore, first application server 108 processes the 25 TPS received from large merchant 104, while second application server 110 processes only the 10 TPS from small merchant 106. As such, a significant imbalance exists between the workload of first application server 108 and the workload of second application server 110.

Further, if first application server 108 were to fail, no automated mechanism exists to redistribute the transaction load from large merchant 104 to second application server 110. In such a case, large merchant 104 would be required to disconnect from load balancer 102 and subsequently establish a new connection with load balancer 102 in order to transmit transactions to second application server 110. Further, once service to first application server 108 is restored, there is no simple, automatic mechanism to rebalance the load between the application servers without disrupting the connections between the clients and the load balancer.

The processes now introduced balance workload, such as that associated with an on-line transaction processing (OLTP) environment, across multiple computer systems. In embodiments of such processes, a plurality of packets are received from a plurality of clients over a plurality of communications sessions. Each of the plurality of packets includes a portion of a transaction involving a financial transaction instrument that requires authorization, and the plurality of packets are then processed to assemble a plurality of transactions. Each of the plurality of transactions is transmitted to a server selected from a plurality of servers that provides the necessary authorization services. The server may be selected from the plurality of servers based on a round-robin distribution of the plurality of servers, and additionally, the round-robin distribution may be modified to account for such factors as workload on, and processing power of, each of the plurality of servers.

Figure 2:
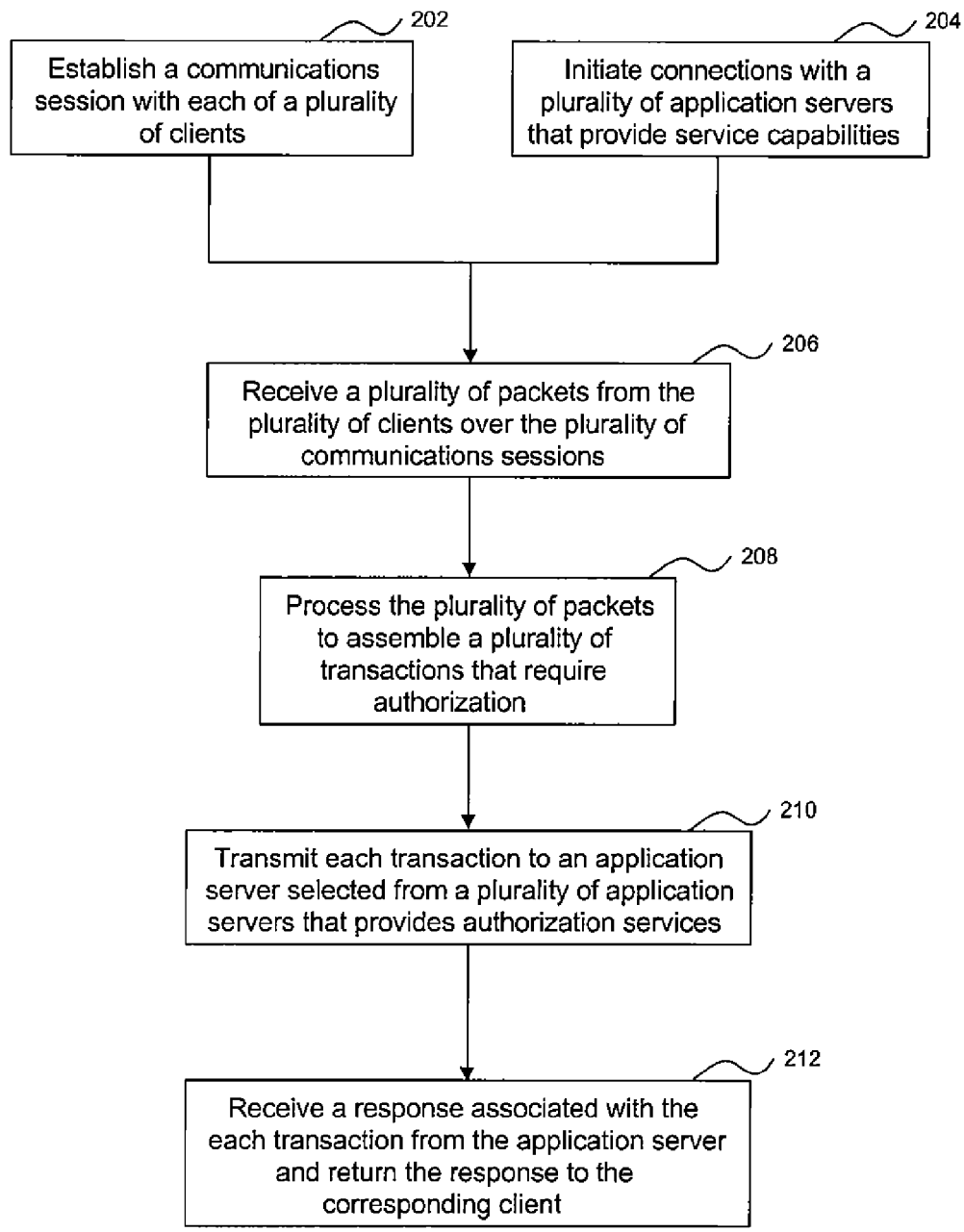
FIG. 2 is a flowchart of an exemplary method for distributing workload across multiple computer systems according to an embodiment of the present invention.

III. Methods, Systems, and Computer-Program Products for Transaction-Based Load Balancing FIG. 2 provides an overview of an exemplary method 200 for distributing workload across multiple computer systems according to an embodiment of the present invention. The exemplary method 200 proceeds by establishing a communications session between a load balancer and each of a plurality of clients in step 202, and the resulting plurality of communications sessions facilitate packet-based communications using streaming protocols, such as the Internet Protocol (EP). In one embodiment, the plurality of communications sessions support the packet-based transmission of transactions involving financial transaction instruments from a combination of merchants and third-party processors.

In a similar fashion, connections are initiated in step 204 between the load balancer and each of a plurality of application servers that provide specific service capabilities, such the authorization of transactions involving financial transaction instruments. The initiated connections may be fully enabled once a response to a heartbeat signal is received from each of the plurality application servers. The response to the heartbeat signal confirms whether transactions may be routed to the application server for authorization. Further, supplemental connections with backup devices including, but not limited to, automated routers and content switches, may also be initiated within step 204.

A plurality of packets is then received at the load balancer from the plurality of clients over the established communications sessions within step 206. In one embodiment, each of the plurality of packets includes a portion of a transaction involving a financial transaction instrument that requires authorization. The received packets comprise a header, which indicates a TCP/IP address of the client and a position of the packet within a sequence of packets, a payload housing the portion of the transaction, and a trailer.

The plurality of packets is then processed within step 208 to assemble a plurality of transactions that respectively require authorization. Data within the header of each of the plurality of packets identifies a client associated with each packet, and a portion of this data may be stored to explicitly link each assembled transaction to its corresponding client and communication session. In addition, data indicating a source client and communications session may be appended to the assembled transaction.

Processing step 208 may also determine a beginning, an end, and a length of each of the plurality of transactions. In one embodiment, the transaction may have a standardized structure, and the beginning, end, and length of the transaction may be determined on the basis of this standardized structure. For example, the transaction may have the structure conforming to "ISO 8583 Standard for Financial Transaction Card Originated Messages—Interchange message specifications," published by the International Standards Organization. Alternatively, a client may prepend a value indicating a length of the transaction to the transaction prior to splitting the transaction among the plurality of packets, and the beginning and end of the transaction may be determined directly from the prepended value.

In step 210, each transaction is transmitted from the load balancer to an application server that is selected from a plurality of application servers that provides authorization, declination, or referral services. In one embodiment, the server may be selected based on a round-robin distribution of the plurality of servers that provide the necessary service. Alternatively, the server may be selected based on a variety of factors including, for example, a workload existing on, and/or processing power of, each of the plurality of servers that provide the necessary service. In additional embodiments, the round-robin distribution may be modified to account for factors such as an existing workload on and/or processing power of each of the plurality of servers.

In step 212, a response associated with the transmitted transaction is received from the selected application server, and the response is returned to the client over the communications session. In one embodiment, the response is an authorization, declination, or referral message, and the response is matched with a corresponding transaction using the data stored in step 208. In an additional embodiment, the data appended to the transaction in step 208 may be used to route the response to the client over the communications session.

Figure 3:
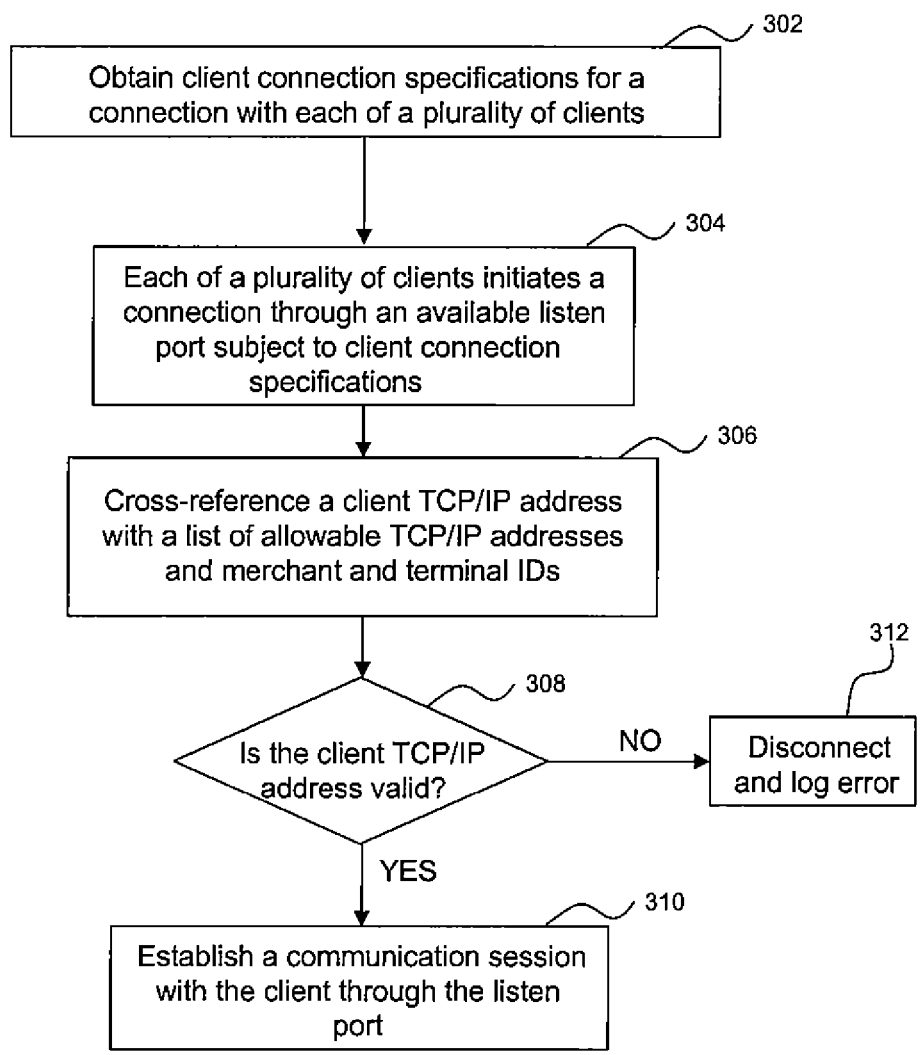
FIG. 3 is a flowchart of a method for establishing communications sessions with clients that may be incorporated into the exemplary method of FIG.

FIG. 3 is a flowchart detailing step 202 of FIG. 2 for establishing communications sessions with clients according to one embodiment. In step 302, client connection specifications are obtained for a potential connection with each of a plurality of clients. The client connection specifications may include: (i) an instance name to which the client belongs; (ii) a name of the client; (iii) the service capability associated with the client connection; (iv) an adapter and listen port for the client connection; (v) a list of allowable TCP/IP source addresses, subnet masks, and merchant and terminal IDs for the client connection; (vi) a maximum message size for the client connection; and (vii) a maximum number of simultaneous client connections through the specific listen port. In one embodiment, an operator, such as a system administrator, generates and modifies the set of client connection specifications through an appropriate interface.

In step 304, each of a plurality of clients, such as merchants and third-party processors, initiates a connection to the load balancer through an available listen port subject to a corresponding client connection specification. Any number of client connections may be initiated subject to additional constraints on memory, performance, and/or hardware.

In step 306, a TCP/IP address for each of the plurality of clients is cross-referenced with a list of allowable set of TCP/IP addresses and merchant and terminal IDs before allowing the client connection. From a security standpoint, a IP address can be easily spoofed and could potentially lead to undesirable events. Step 308 then verifies that the TCP/IP address of each client is valid. If a client TCP/IP address does not appear within the list of allowable TCP/IP addresses and merchant and terminal IDs, then the client connection is disconnected and an error message is logged in step 312. If, however, step 306 verifies that the TCP/IP address of the client does appear within the allowable list of TCP/IP addresses and merchant and terminal IDs, a communication session is established with the client through the listen port in step 310.

Although not shown in FIG. 3, method 202 may also determine a number of client connections associated with the listening port, and the number of client connections may be compared with the maximum number of connections for the listen port. If the number of client connections on the listen port is equivalent to the maximum number of connections, then the listen port may be closed to additional connections. If, however, the number of client connections is below the maximum number of connections, then additional clients may initiate connections through the listen port.

Figure 4:
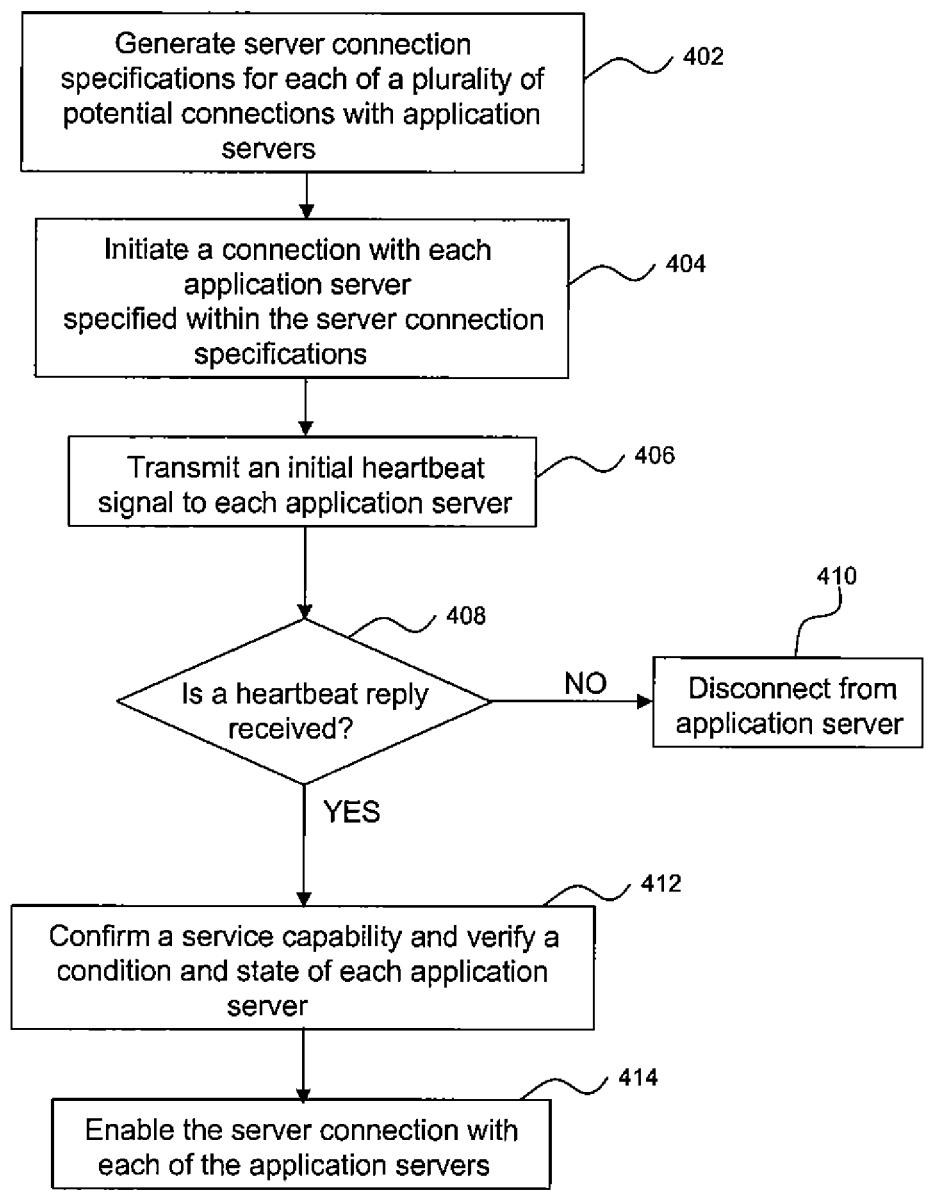
FIG. 4 is a flowchart of a method for initiating connections with application servers that may be incorporated into the exemplary method of FIG. 1.

FIG. 4 is a flowchart detailing step 204 of FIG. 2 for initiating connections with a plurality of application servers according to one embodiment. In step 402, a server connection specification is generated for each of a plurality of potential connections with application servers. These server connection specifications may include (i) a name of the server connection and its instance; (ii) a host name and a port of the application server; (iii) a service capability associated with the server connection; (iv) a maximum message size for the server connection; (v) a heartbeat interval and a maximum reply time for the server connection; and (vi) a unique value indicating a backup level of the server. In one embodiment, an operator, such as a system administrator, generates and modifies the set of server connection specifications through an appropriate interface.

In step 404, connections are initiated with each of the application servers specified within the server connection specifications generated in step 402. Once connections are initiated within step 404, an initial heartbeat signal is sent to each connected application server within step 406. The initial heartbeat signal confirms that the application server is functional, and a reply to the initial heartbeat signal is necessary to enable the connections to the application servers.

Step 408 then determines whether a reply to the initial heartbeat signal has been received within the maximum reply time associated with the server connection. If a reply to the initial heartbeat signal is not received within the maximum reply time, then the connection with the application server is terminated in step 410.

If a reply to the initial heartbeat signal is received within the maximum reply time, then step 412 confirms the service capability associated with the application server and verifies a condition and state of the application server. In one embodiment, the condition of the application server describes the ability of the application server to provide the service capability, and the state of the application server indicates whether the client messages can be routed to the application server for processing. The server connection with the application server is then enabled within step 414.

Exemplary method 204 has been described in reference to server connections involving application servers. However, in additional embodiments, exemplary method 204 may be used to initiate connections with an additional number of backup devices including, but not limited to, automated routers and content switches. These additional devices may provide service capabilities or may be connected to application servers that provide service capabilities.

Figure 5:
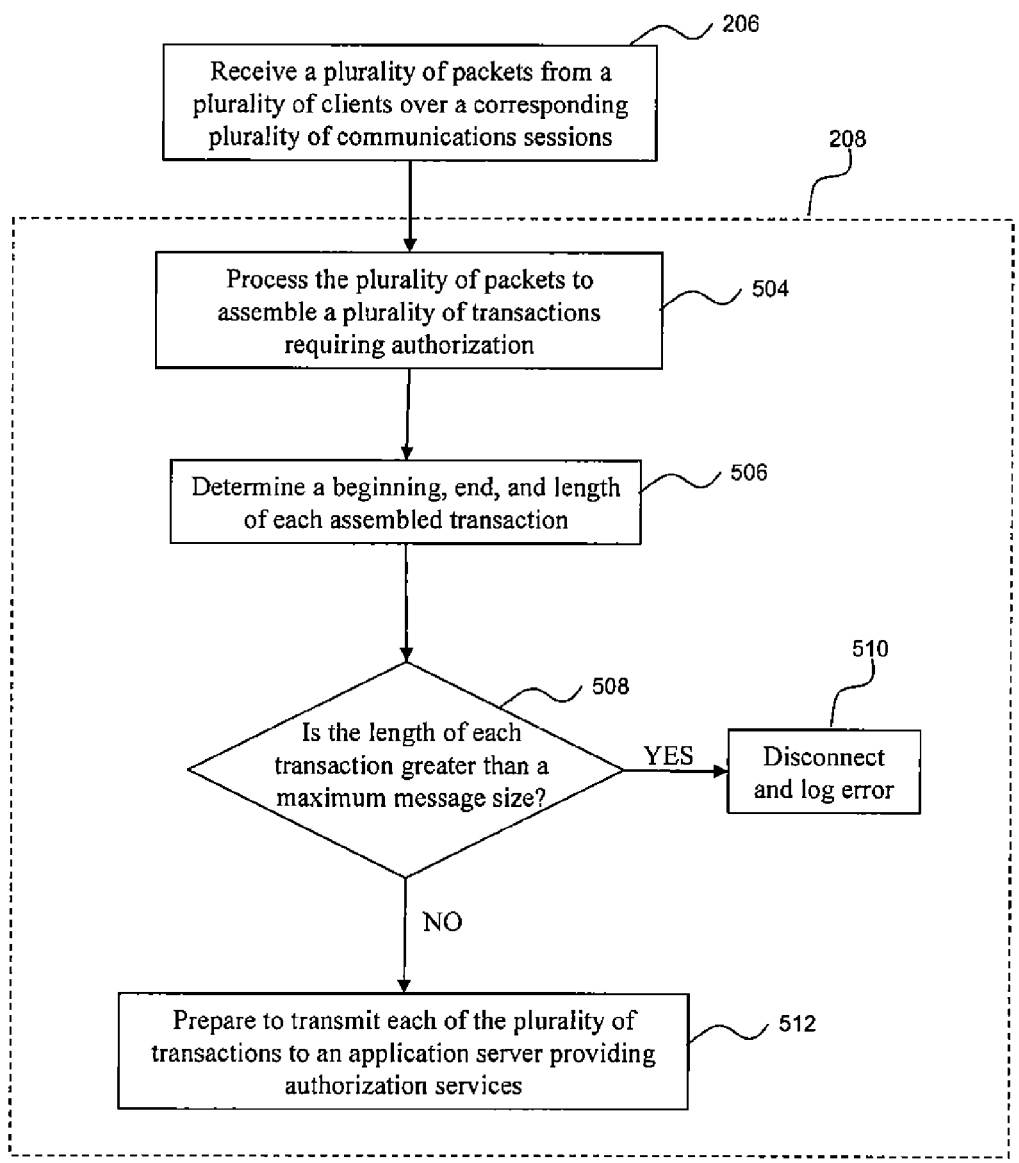
FIG. 5 is a flowchart of a processing step that may be incorporated into the exemplary method of FIG. 1.

FIG. 5 is a flowchart showing step 206 of FIG. 2 and detailing step 208 of FIG. 2 according to one example embodiment. In step 206, a plurality of packets has been received from a plurality of clients over a corresponding plurality of communications sessions. Each of the plurality of packets may include a portion of a transaction involving a financial transaction instrument that requires authorization, and the plurality of packets are processed in step 504 to assemble a plurality of transactions. In addition, step 504 may associate an individual packet with a client and a communications session using data within the header of the packet, such as a TCP/IP address of the client. Further, the plurality of packets associated with a particular payload and client may be assembled within step 504 based on a packet number provided within the packet header.

Once the transactions have been assembled, step 506 determines a beginning, an end, and a length of each transaction. In one embodiment, the transaction has a standardized structure, and the beginning, end, and length of the transaction is determined from the standardized structure. Examples of the standardized structure include, but are not limited to, that described within "ISO 8583 Standard for Financial Transaction Card Originated Messages—Interchange message specifications," published by the International Standards Organization.

In an additional embodiment, a client may prepend a value indicating a length of the transaction to the transaction prior to splitting the transaction among the plurality of packets. The beginning and end of the transaction may then be determined from the prepended value without any analysis of the underlying structure of the transaction.

Step 508 then determines whether the length of each of the plurality of transactions exceeds a maximum message size associated with the communications session and server connection. If the length exceeds the maximum message size, then the communications session with the client associated with the transaction is disconnected in step 510, and an error message is logged.

However, if the length is less the maximum message size for the corresponding communication session, then the transaction of is prepared for transmission to an application server for authorization, declination, or referral in step 512.

Figure 6:
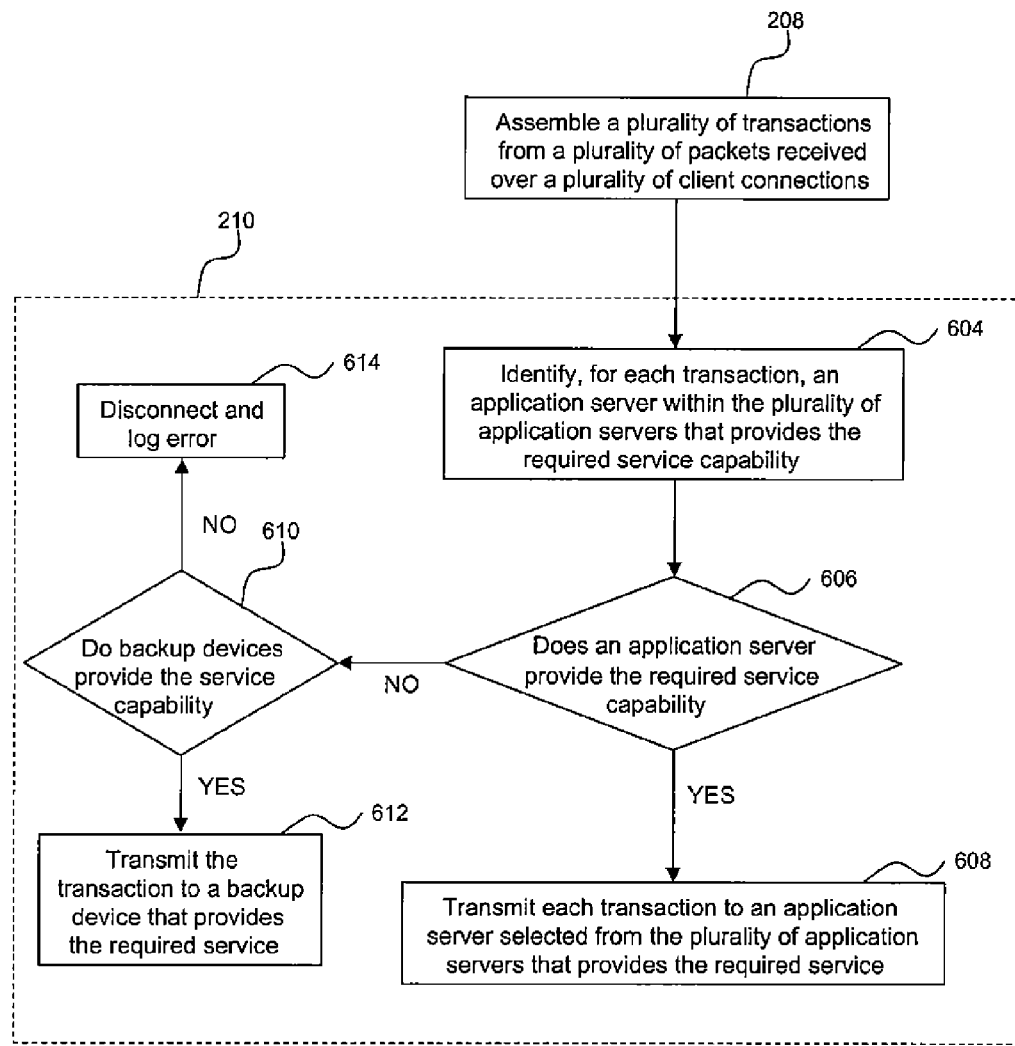
FIG. 6 is a flowchart of a transmission step that may be incorporated into the exemplary method of FIG. 1.

FIG. 6 is a flowchart showing step 208 of FIG. 2 and detailing step 210 of FIG. 2 according to one example embodiment. In step 208, a plurality of transactions have been assembled from a plurality of packets received from a plurality of clients over a corresponding plurality of communication sessions. For each transaction, step 604 identifies an application server within the plurality of application servers that provides the required service capability, i.e., the authorization of a transaction involving a financial transaction instrument. Step 606 confirms that at least one application server has been identified to provide the required service. If at least one application server provides the service capability in step 606, then the transaction is transmitted in step 608 to an application server selected from the plurality of application servers that provide the service.

In one embodiment, the application sever is selected from the plurality of application servers based on a round-robin distribution of the plurality of application servers that provide the service capability. Using the round robin distribution, one transaction is transmitted to an application sever that provides the service capability. A second transaction is then transmitted to the next application server in sequence that provides the service capability. The above-described process continues until each of the plurality of transactions have been assigned to an application server that provides the service capability.

In an additional embodiment, the application sever is selected from the plurality of application servers based on a variety of factors including, for example, a workload existing on, and/or processing power of, each of the plurality of application servers. Further, the round-robin distribution described above may be adjusted to account for such factors as an existing workload on and/or processing power of each of the plurality of servers.

If, however, step 606 determines that none of the plurality of application servers provides the service capability, then the exemplary method passes to step 610, which determines whether any backup devices exist that (i) provide the service capability or (ii) are connected to application servers that provide the service capability. If step 610 determines that a backup device provides the necessary service, then the transaction is transmitted to that backup device in step 612. If, however, no backup devices provide the necessary service, the communications session with the client associated with the transaction is disconnected in step 614, and an error message is logged. In one embodiment, a server connection specification for a connection with an application server may indicate that the particular application server is a backup that provides a specific service capability.

Figure 7:
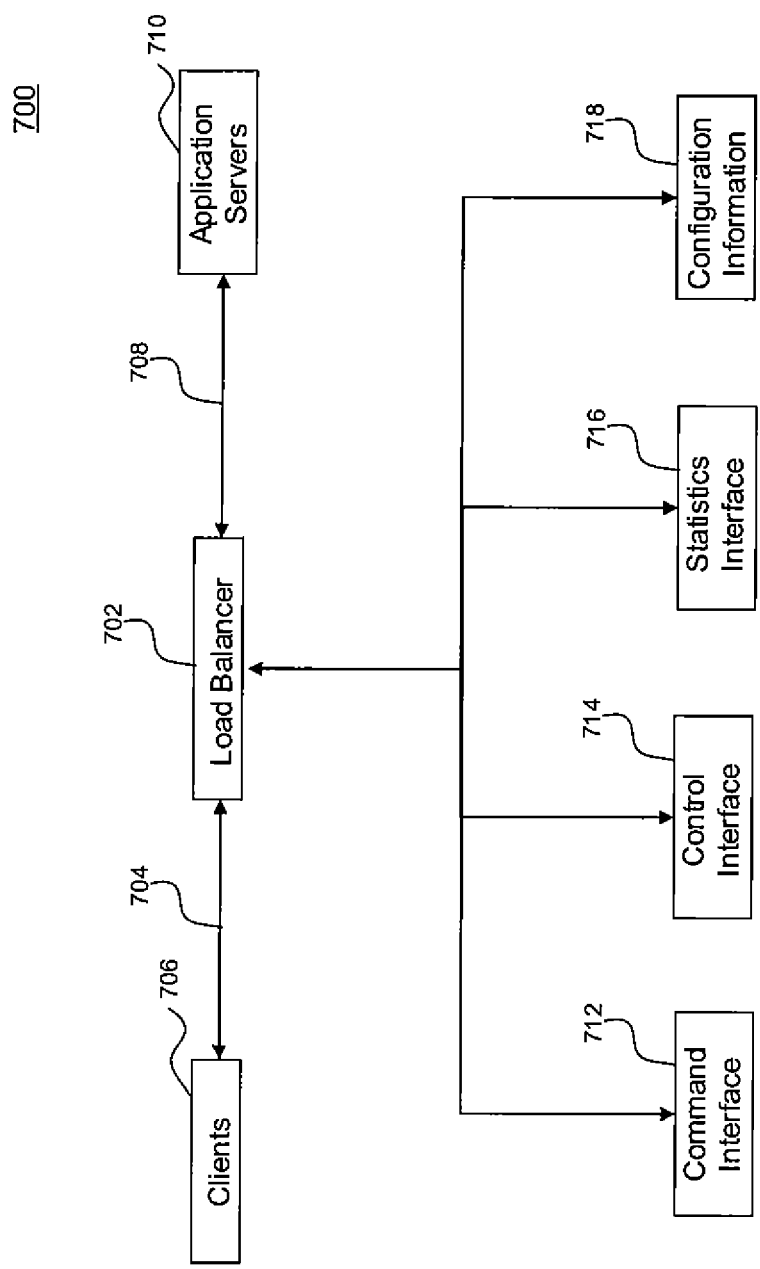
FIG. 7 is a block diagram of a system for balancing workload across multiple computer systems.

FIG. 7 is a detailed overview of an exemplary system 700 for balancing workload across multiple computer systems. Exemplary system 700 comprises a load balancer 702, which is connected to a plurality of clients 706 through a corresponding plurality of communications sessions 704. Load balancer 702 is also connected to a plurality of application servers 710 through a corresponding plurality of server connections 708. The plurality of application servers provide service capabilities required by clients 706.

In one embodiment, a plurality of packets are transmitted from clients 706 to load balancer 702. Each of the plurality of packets includes a portion of a transaction involving a financial instrument that requires authorization. The packets may comprise a header, which indicates a TCP/IP address of the client and a position of the packet within a sequence of packets, a payload housing the portion of the transaction, and a trailer.

Each of the plurality of packets is then processed by load balancer 702 to assemble a plurality of transactions. Data within the header of each of the plurality of packets may identify a source of each packet. A portion of this data may be stored at the load balancer to explicitly link each assembled transaction to its corresponding client and communication session. Additionally, data indicating a client and communications session may be appended to the each of the plurality of transactions.

Load balancer 702 may additionally determine a beginning, an end, and a length of each of the plurality of transactions. In one embodiment, the transaction may have a standardized structure, and the length of the authorization transaction may be determined from this standardized structure. Examples of standardized structures include, but are not limited to, that described within "ISO 8583 Standard for Financial Transaction Card Originated Messages—Interchange message specifications," published by the International Standards Organization. Alternatively, a client may prepend a value indicating a length of the transaction prior to splitting the transaction among the plurality of packets, and the beginning and end of the transaction may be determined directly from the prepended value.

In contrast to the session-based load balancing described with reference to FIG. 1, load balancer 702 individually transmits each of the assembled transactions to an application server selected from the plurality of application servers 710 that provides the necessary authorization services. In one embodiment, the server may be selected based on a round-robin distribution of the plurality of servers that provides the necessary authorization services. Alternatively, the server may be selected based on a variety of factors including, for example, a workload existing on, and/or processing power of, each of the plurality of servers that provide the necessary authorization services. In additional embodiments, the round-robin distribution may be modified to account for such factors as a workload existing on and/or processing power of each of the plurality of servers.

Further, load balancer 702 may receive responses associated with the transmitted transactions from application servers 710, and the responses may be returned to clients 706 over communications sessions 704. These responses may include, but are not limited to, messages indicating authorization, declination, and referral. In one embodiment, a response is matched with a corresponding transaction using data stored by load balancer 702 that associates the transaction with its client and a communications session. In an additional embodiment, the data appended to a transaction by load balancer 702 may be used to return the response to the client over the communications session.

In FIG. 7, a command interface 712 accesses load balancer 702 and allows an operator, such as a system administrator, to query the status of load balancer 702 and to control the operation of load balancer 702. In one embodiment, command interface 712 displays a status of and configuration information for clients 706 and application servers 710. In an additional embodiment, command interface 712 provides the operator the ability to (i) create and modify specifications for communications sessions 704 and server connections 708; (ii) disable or enable tracing that records all traffic between load balancer 702 and both clients 706 and application servers 710; and (iii) shutdown load balancer 702. In further embodiments, command interface 712 allows the operator to interface with load balancer 702 from a remote location.

Additionally, a control interface 714 allows application servers 710 to access load balancer 702 and configure their connections with load balancer 702. In one embodiment, control interface 714 allows an application server within the plurality of application servers 710 to specify a TCP/IP address, a service capability, a condition of the service capability, and a state of the application server.

Further, a statistics interface 716 accesses load balancer 702 without disrupting the operation of load balancer 702. In one embodiment, statistics interface 714 may provide access to statistics that (i) describe the operation of load balancer 702, (ii) describe the operation of each application server within the plurality of application servers 710, (iii) describe the operation of each client within the plurality of clients 706, and (iv) describe communications sessions 704. Additionally, statistics interface 716 may provide a stand-alone utility to display the current statistics describing the operation of load balancer 702.

In addition, a configuration file 718 may also be associated with load balancer 702. In one embodiment, configuration file 716 is a plain-text file that incorporates configuration data on load balancer 702, clients 706, and application servers 706, as well as data on the command, control, and statistics interfaces 712, 714, and 716. In additional embodiments, command interface 712 and control interface 714 may edit the data stored within configuration file 716.

In an additional embodiment, application servers 710 may be in communication with mainframe computer systems and/or database servers (not shown) that are associated with a provider of the financial transactions instruments and that provide additional service capabilities.

Figure 8:
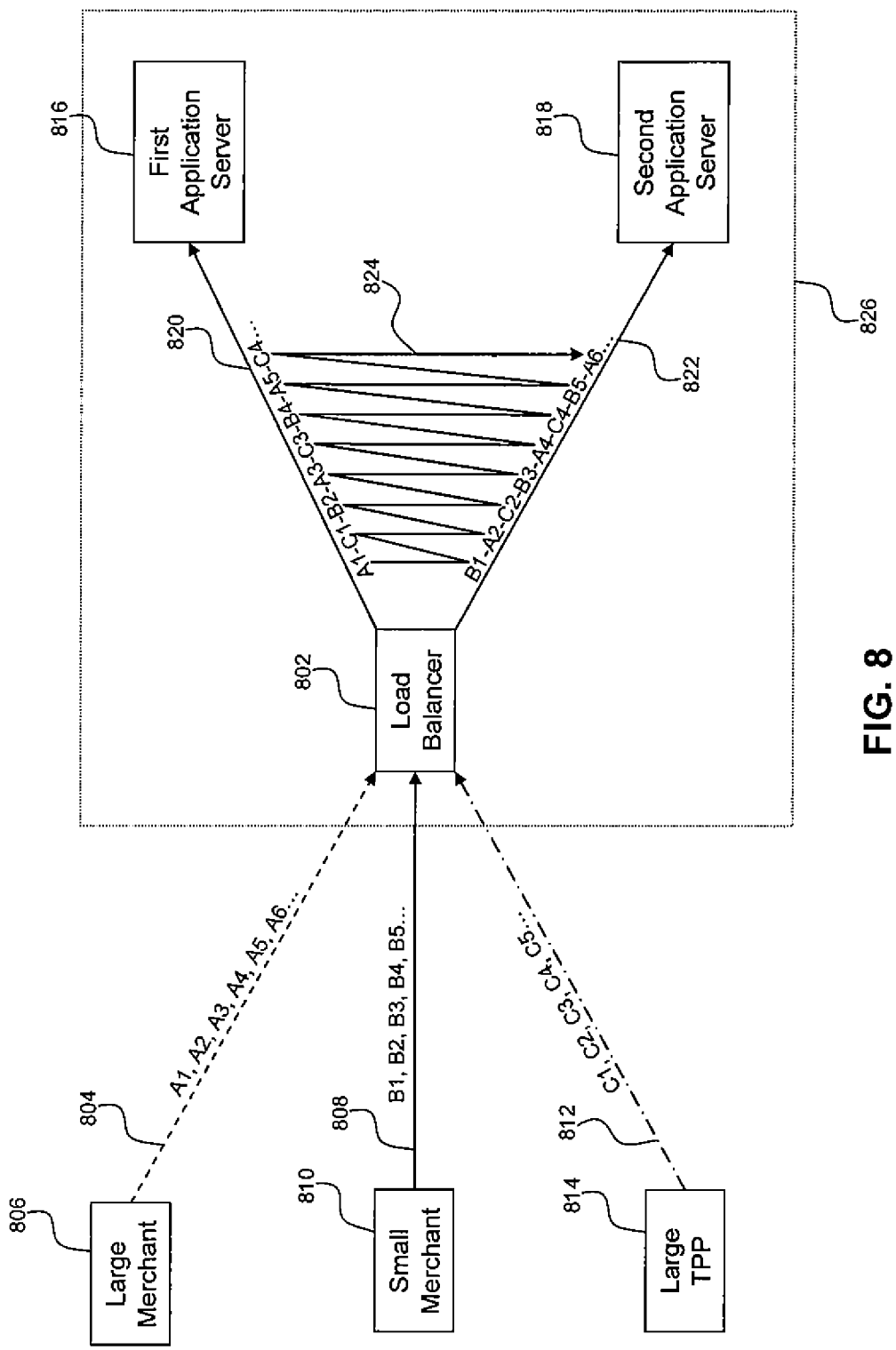
FIG. 8 is an example that further illustrates dataflow in the embodiment of the present invention outlined in FIG. 7.

FIG. 8 is a block diagram that further illustrates the operation of the exemplary system described with reference to FIG. 7. In FIG. 8, a large merchant 806 establishes a first communication session 804 with a load balancer 802. A small merchant 810 subsequently establishes a second communication session 808 with load balancer 802, and a large third-party processor 814 establishes a third communication session 812 with load balancer 802. In the embodiment of FIG. 8, communications sessions 804, 808, and 812 are long-lived sessions that may extend for hours, days, and/or weeks.

Load balancer 802 may also establish connections with a plurality of application servers that provide the authorization services required by large merchant 806, small merchant 810, and large third-party processor (TPP) 814. In the embodiment of FIG. 8, load balancer 802 establishes connections with a first application server 816 and a second application server 818 along server connections 820 and 822, respectively. Although not depicted in FIG. 8, first application server 816 and second application server 818 may be connected to additional mainframe computers and database servers that provide additional service capabilities. The connection of load balancer 802 to its application servers establishes a node 826. In additional embodiments, large merchant 806, small merchant 810, and large third-party processor 814 may be individually connected to additional nodes.

Large merchant 806, small merchant 810, and large third-party processor 814 transmit a plurality of packets to load balancer 802, and each transmitted packet includes a portion of a transaction involving a financial transaction instrument that requires authorization. In the example of FIG. 8, large merchant 806 transmits transactions, such as transactions A1, A2, A3, A4, A5, and A6, through first communication session 804 to load balancer 802 at a rate of 25 transactions-per-second (TPS). Further, small merchant 810 transmits transactions, such as transactions B1, B2, B3, B4, and B5, through second communication session 808 to load balancer 802 at a rate of 10 TPS. In a similar fashion, large third-party provider 814 transmits transactions, such as transactions C1, C2, C3, C4, and C5, through third communication session 812 to load balancer 802 at a rate of 40 TPS.

Load balancer 802 processes the plurality of packets to assemble the transactions received from large merchant 806, small merchant 810, and large third-party provider 814. The assembled transactions are then transmitted to first application server 816 and second application server 818 according to a round-robin distribution. For example, load balancer 802 distributes transaction A1 from large merchant 806 to first application server 816 through communications path 820. Load balancer 802 next distributes transaction B1 from small merchant 810 to second application server 818 through communications path 822. Since one transaction has been assigned to each available server, load balancer 802 distributes transaction C1 from large third-party processor 814 to first application server 816 through communications path 820, and subsequently distributes transaction A2 from large merchant 806 to second application server 818 through communications path 822. The distribution of each of the plurality of transactions by load balancer 802 to application servers 816 and 818 continues in round-robin fashion according to a distribution scheme 824.

In contrast to the session-based load balancing described with reference to FIG. 1, the round-robin distribution of transactions to first application server 816 and second application server 818 results in balanced distribution of workload between the individual application servers. Further, the transaction-based load balancing described in FIG. 8 provides a mechanism for routing traffic around server failures that is largely invisible to large merchant 806, small merchant 810, and large third-party provider 814. For example, if first application server 816 were to fail, load balancer 802 would simply route all transactions from large merchant 806, small merchant 810, and large third-party provider 814 to second application server 818 until first application server 816 is available. As such, large merchant 806, small merchant 810, and large third-party provider 814 are not required to disconnect and subsequently re-establish their respective communications sessions, and load balancer 802 automatically re-routes traffic back to first application server 816 when first application server 816 returns to service.

Figure 9:
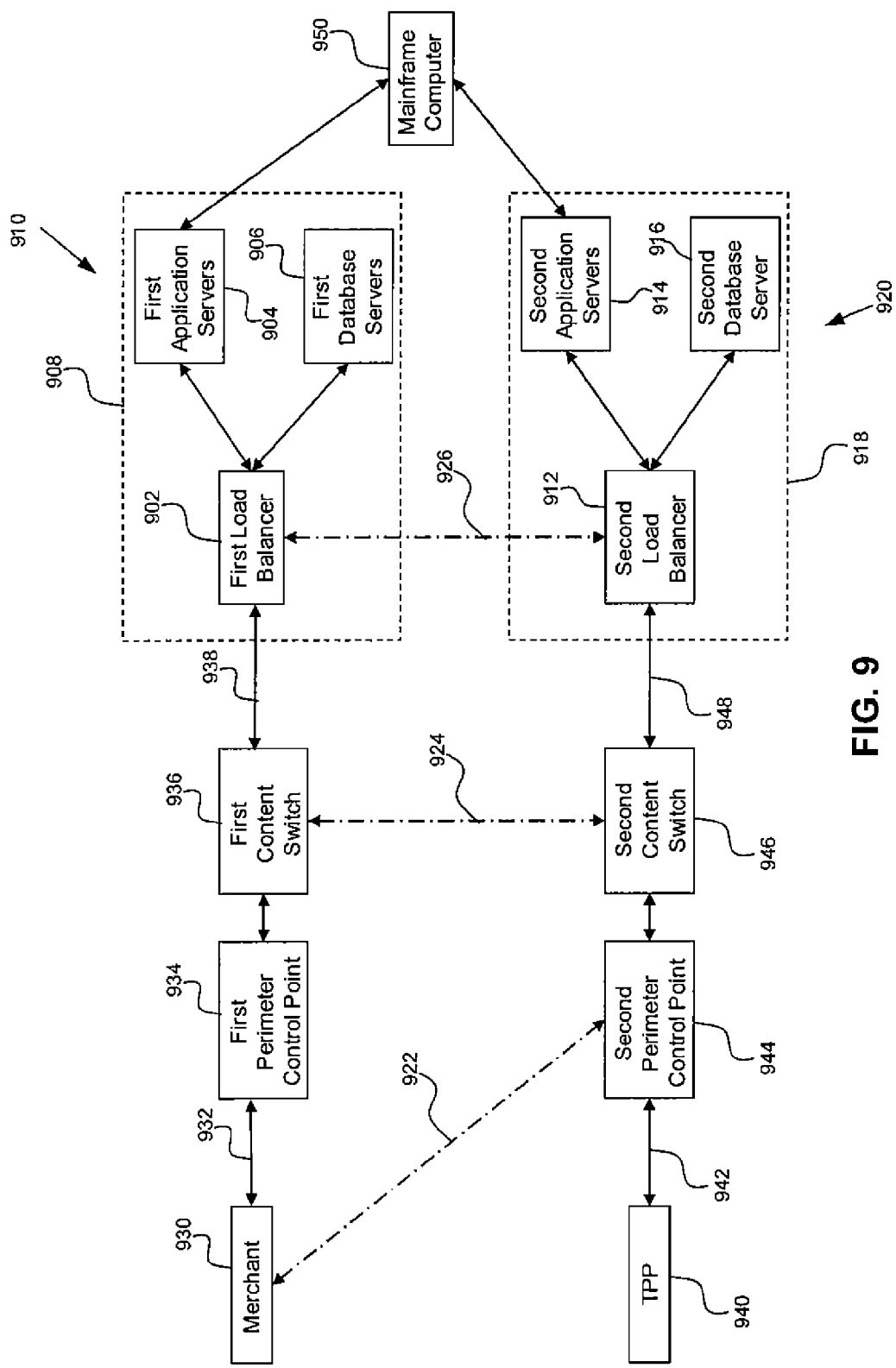
FIG. 9 is an additional example that further illustrates the embodiment of the present invention outlined in FIG. 7.

FIG. 9 is an additional example that further illustrates the embodiment described above with reference to FIG. 7. In FIG. 9, service capabilities of a plurality of clients are met by multiple load balancers that respectively distribute workload to individual application servers.

As illustrated, a first load balancer 902 is connected to a plurality of first application servers 904 and a first database server 906, thus forming a node 908 at a first site 910. Further, a second load balancer 912 is connected to a plurality of second application servers 914 and a second database server 916 to form a second node 918 at a second site 920. First application servers 904 and second application servers 912 may also be respectively connected to an external mainframe computer 950 associated with a provider of financial transaction instruments.

A plurality of clients, including but not limited to, a merchant 930 and a third-party processor (TPP) 940, are respectively connected to load balancer 902 and 912 so that transactions requiring authorization are routed to application servers that provide authorization. In FIG. 9, merchant 930 establishes a connection 932 with a first perimeter control point 934, which is in turn connected to a first content switch 936. First content switch 936 transmits all traffic received by first perimeter control point 934 to first load balancer 902 along a first communications session 938. In a similar fashion, third-party processor 940 establishes a connection 942 with a second perimeter control point 944, which is in turn connected to a second content switch 946. Second content switch 946 transmits all traffic received by second perimeter control point 944 to second load balancer 912 along a second communications session 948.

Perimeter control points 934 and 944 respectively filter the packet data from merchant 930 and third-party processor 940 before the packet data is routed to load balancers at first site 910 and second site 920. In one embodiment, perimeter control points 934 and 944 may comprise an access control device, a firewall, and an intrusion detection and prevention (IDP) device.

As described above with respect to FIG. 8, merchant 930 and third-party processor 940 respectively transmit a plurality of packets to first load balancer 902 and second load balancer 912, which respectively process the received packets to assemble a plurality of transactions that require authorization. Load balancers 902 and 912 then respectively transmit the plurality of transactions to application servers 904 and 914 for authorization, declination, or referral. In one embodiment, the assembled transactions are transmitted according to a round-robin distribution of application servers that provide the required service. Additionally, the transmission of the assembled transactions to application servers may be based on a variety of factors including, for example, a workload existing on, and/or processing power of, each of the application servers. Application servers 904 and 914 may forward responses to the transactions to load balancers 902 and 912, respectively, and load balancers 902 and 912 may associate these responses with a particular client and return these responses to the client.

In the example of FIG. 9, first load balancer 902 is connected to second load balancer 912 along communications link 926, which provides an additional level of redundancy in case of a server failure. For example, first application servers 904 may be unavailable to provide a service capability required by packet data received by load balancer 902. In contrast to the session-based load balancing described with reference to FIG. 1, first load balancer 902 may re-direct the transactions from merchant 930 to second load balancer 912 (or to any additional load balancer that provides the service capability) without adversely affecting the communication session with merchant 930. In further contrast to session-based load balancing, first load balancer 902 automatically routes transactions back to first application servers 904 in an effort to balance workload once first application servers 904 become available.

First content switch 936 also communicates with second content switch 946 along communication link 924, thus providing another layer of redundancy in an instance of a node failure. For example, if load balancer 902 were unavailable to receive and process transactions, first content switch 936 could route all traffic from merchant 930 along communications path 924 to second content switch 946. Second content switch 946 would then transmit all traffic from merchants 930 and third-party processor 940 to second load balancer 912. In contrast to the session-based load balancing, neither merchant 930 nor third-party processor 940 would recognize that first node 908 had failed, and further, the traffic may be automatically re-routed to first load balancer 902 when first load balancer 902 becomes available.

In additional embodiments, multiple nodes, such as nodes 908 and 918, may be incorporated into a single site, and individual clients may establish communications with each of the multiple nodes of the site. In contrast to the example described above, a failure of a single node would not result in site failure. Instead, a content switch associated with a client would transfer packet data to load balancers on remaining nodes within the site, thus providing a remedy that is largely invisible to the affected clients.

Further, individual clients may desire or require an ability to establish communication sessions with load balancers on multiple nodes. For example, merchant 930 may establish a connection with (i) first load balancer 902 of first node 908 through connection 922 with first perimeter control point 944; and (ii) second load balancer 912 of second node 918 through communications link 942 with second perimeter control point 944. Therefore, multiple pathways for authorization of transactions may be established by merchant 930.

The embodiments and examples described herein address the distribution of transactions for authorization of transactions involving financial transaction instruments to application servers that provide authorization, declination, or referral. In additional embodiments, the methods and systems described herein may accommodate the receipt of packet-based transmissions of a variety of units of work requiring specific service capabilities and the distribution of these units of work to application servers that provide the service capabilities. Examples of such units of work include, but are not limited to, email messages from email clients that require distribution to individual email servers and executed trades for securities received from traders and/or brokers that require settlement. Further, a number of additional units of work requiring particular service capabilities would be apparent to one skilled in the relevant arts.

IV. Exemplary Computer Systems

Figure 10:
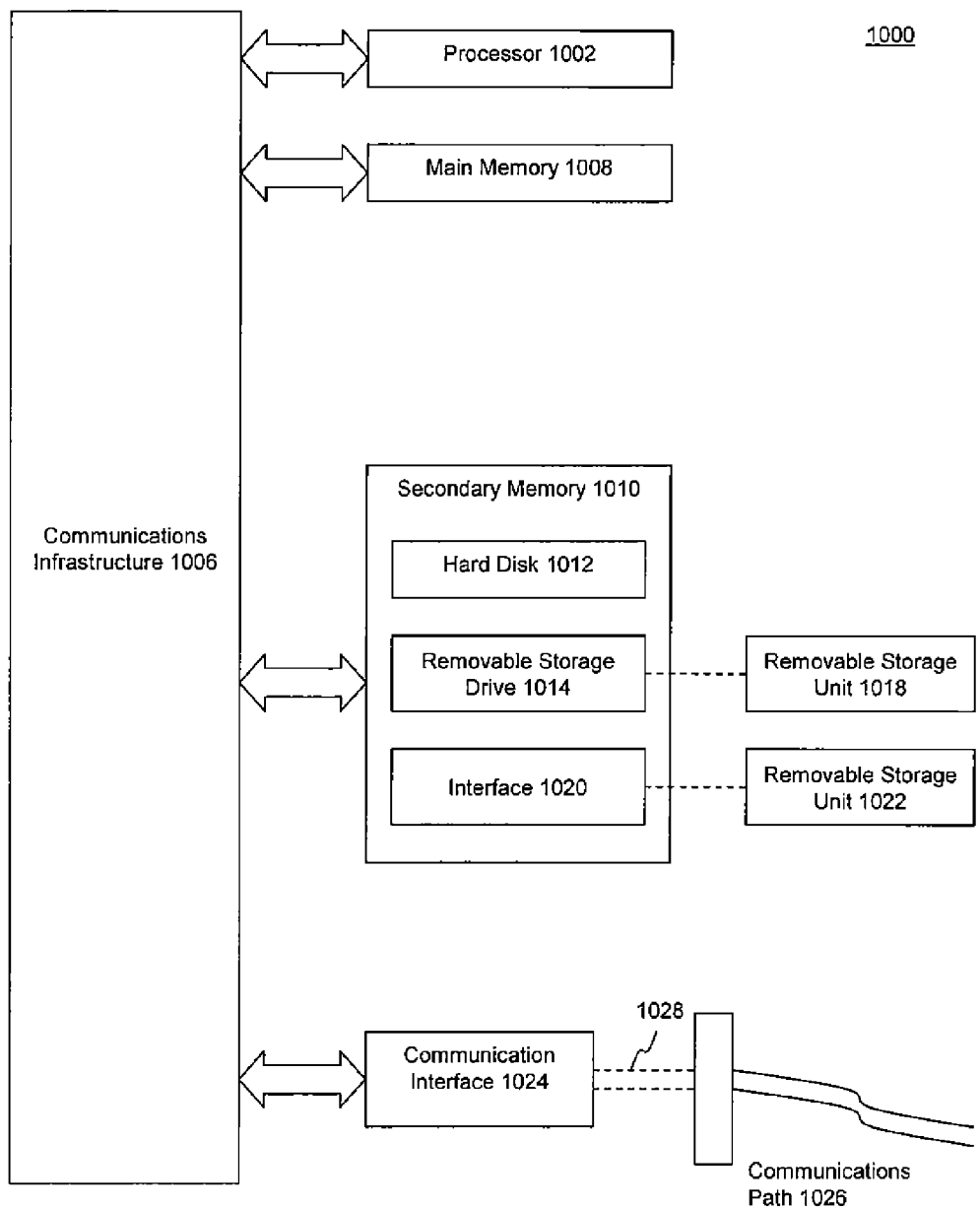
FIG. 10 is a diagram of an exemplary computer system upon which the present invention may be implemented.

FIG. 10 is a diagram of an exemplary computer system 1000 upon which the present invention may be implemented. The exemplary computer system 1000 includes one or more processors, such as processor 1002. The processor 1002 is connected to a communication infrastructure 1006, such as a bus or network. Various software implementations are described in terms of this exemplary computer system. After reading this description, it will become apparent to a person skilled in the relevant art how to implement the invention using other computer systems and/or computer architectures.

Computer system 1000 also includes a main memory 1008, preferably random access memory (RAM), and may include a secondary memory 1010. The secondary memory 1010 may include, for example, a hard disk drive 1012 and/or a removable storage drive 1014, representing a magnetic tape drive, an optical disk drive, etc. The removable storage drive 1014 reads from and/or writes to a removable storage unit 1018 in a well-known manner. Removable storage unit 1018 represents a magnetic tape, optical disk, or other storage medium that is read by and written to by removable storage drive 1014. As will be appreciated, the removable storage unit 1018 can include a computer usable storage medium having stored therein computer software and/or data.

In alternative implementations, secondary memory 1010 may include other means for allowing computer programs or other instructions to be loaded into computer system 1000. Such means may include, for example, a removable storage unit 1022 and an interface 1020. An example of such means may include a removable memory chip (such as an EPROM, or PROM) and associated socket, or other removable storage units 1022 and interfaces 1020, which allow software and data to be transferred from the removable storage unit 1022 to computer system 1000.

Computer system 1000 may also include one or more communications interfaces, such as communications interface 1024. Communications interface 1024 allows software and data to be transferred between computer system 1000 and external devices. Examples of communications interface 1024 may include a modem, a network interface (such as an Ethernet card), a communications port, a PCMCIA slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (i.e., channel) 1026. This channel 1026 carries signals 1028 and may be implemented using wire or cable, fiber optics, an RF link and other communications channels. In an embodiment of the invention, signals 1028 comprise data packets sent to processor 1002. Information representing processed packets can also be sent in the form of signals 1028 from processor 1002 through communications path 1026.

The terms "computer program medium" and "computer usable medium" are used to refer generally to media such as removable storage units 1018 and 1022, a hard disk installed in hard disk drive 1012, and signals 1028, which provide software to the computer system 1000.

Computer programs are stored in main memory 1008 and/or secondary memory 1010. Computer programs may also be received via communications interface 1024. Such computer programs, when executed, enable the computer system 1000 to implement the present invention as discussed herein. In particular, the computer programs, when executed, enable the processor 1002 to implement the present invention. Where the invention is implemented using software, the software may be stored in a computer program product and loaded into computer system 1000 using removable storage drive 1014, hard drive 1012 or communications interface 1024.

CONCLUSION

The disclosed methods, systems, and computer program products efficiently and automatically distribute transaction traffic from clients to application servers for authorization, declination, or referral. Further, these disclosed methods, systems, and computer program products provide a non-disruptive mechanism to re-route transaction traffic around failures in transaction processing capability.

Clients, such as merchants and third-party processors, obtain transaction processing services across long-lived communication sessions without the disruptions that accompany site and node failures in session-based load balancing environments. Providers of financial transaction instruments also benefit from an efficient utilization of their server assets. The disclosed processes allow the provider to scale easily the number of application servers within a single node, and further, the provider has the freedom to take down individual nodes and application servers for maintenance and software upgrades without disrupting communications sessions with clients.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer-implemented method comprising:
processing, by a computer-based system for transaction load balancing, a first plurality of data packets from a streaming protocol in a communication session to assemble a first transaction;
processing, by the computer-based system, a second plurality of packets from the streaming protocol to assemble a second transaction;
selecting, by the computer-based system, a first server from a plurality of servers to process the first transaction;
selecting, by the computer-based system, a second server from the plurality of servers to process the second transaction, wherein the selecting the first server and the selecting the second server comprises selecting the first server and selecting the second server based on a round-robin distribution of the plurality of servers and a workload on the plurality of servers;
transmitting, by the computer-based system, the first transaction to the first selected server; and
transmitting, by the computer-based system, the second transaction to the second selected server.

2. The method of claim 1, further comprising returning, by the computer-based system, a response associated with the first transaction.

3. The method of claim 1, wherein the processing further comprises determining a beginning and an end of the first transaction.

4. The method of claim 3, wherein the determining further comprises determining the beginning and end of the first transaction based on at least one of a standardized structure of the transaction or a value prepended to the transaction.

5. The method of claim 1, further comprising receiving, by the computer-based system, a plurality of transactions from a plurality of clients over a plurality of communications sessions, wherein each of the plurality of transactions are represented by a plurality of packets.

6. The method of claim 1, wherein the first transaction represents a transaction account purchase.

7. The method of claim 1, wherein the selecting comprises determining, by the computer-based system, that the first server is incapable of processing the transaction, and transmitting, by the computer-based system, the transaction from a first load balancer to a second load balancer.

8. The method of claim 1, further comprising detecting, by the computer-based system, a heartbeat signal of the first server.

9. The method of claim 1, wherein each of the first plurality of data packets includes a portion of the first transaction.

10. The method of claim 1, wherein a data packet comprises a header with identifying information.

11. The method of claim 1, wherein the first transaction comprises a structure conforming to ISO 8583 Standard for Financial Transaction Card Originated Messages-Interchange message specifications.

12. The method of claim 1, wherein the first server returns a response of at least one of authorized, declined, or a referral message.

13. The method of claim 1, further comprising terminating, by the computer-based system, a connection with a server in response to a predetermined time elapsing without detecting a heartbeat signal from the first server.

14. The method of claim 1, further comprising disconnecting, by the computer-based system, a communications session, in response to detecting a transaction larger than a maximum message size associated with the communications session.

15. The method of claim 1, further comprising storing, by the computer-based system, information associated with the transactions on a load balancer.

16. The method of claim 15, further comprising linking, by the computer-based system, the assembled transactions with corresponding communication sessions by the information stored on the load balancer.

17. An article of manufacture including a non-transitory, tangible computer readable storage medium having instructions stored thereon that, in response to execution by a computer-based system for transaction based load balancing, cause the computer-based system to perform operations comprising:
processing, by the computer-based system, a first plurality of data packets from a streaming protocol in a communication session to assemble a first transaction;
processing, by the computer-based system, a second plurality of packets from the streaming protocol to assemble a second transaction;
selecting, by the computer-based system, a first server from a plurality of servers to process the first transaction;
selecting, by the computer-based system, a second server from the plurality of servers to process the second transaction, wherein the selecting the first server and the selecting the second server comprises selecting the first server and selecting the second server based on a round-robin distribution of the plurality of servers and a workload on the plurality of servers;
transmitting, by the computer-based system, the first transaction to the first selected server; and
transmitting, by the computer-based system, the second transaction to the second selected server.

18. A system comprising:

a processor for transaction based load balancing, a tangible, non-transitory memory configured to communicate with the processor, the tangible, non-transitory memory having instructions stored thereon that, in response to execution by the processor, cause the processor to perform operations comprising:

processing, by the processor, a first plurality of data packets from a streaming protocol in a communication session to assemble a first transaction;

processing, by the processor, a second plurality of packets from the streaming protocol to assemble a second transaction;

selecting, by the processor, a first server from a plurality of servers to process the first transaction;

selecting, by the processor, a second server from the plurality of servers to process the second transaction, wherein the selecting the first server and the selecting the second server comprises selecting the first server and selecting the second server based on a round-robin distribution of the plurality of servers and a workload on the plurality of servers;

transmitting, by the processor, the first transaction to the first selected server; and transmitting, by the processor, the second transaction to the second selected server.

* * * * *